United States Patent  
Hashimoto et al.

(10) Patent No.: US 12,319,134 B2
(45) Date of Patent: Jun. 3, 2025

(54) ELECTRIC TRACTOR

(71) Applicants: Yanmar Holdings Co., Ltd., Osaka (JP); Toyota Motor Corporation, Toyota (JP)

(72) Inventors: Yusuke Hashimoto, Okayama (JP); Taihei Daiyakuji, Okayama (JP); Masashi Matsumoto, Toyota (JP); Tomohiko Miyamoto, Toyota (JP); Hirotsugu Iwamoto, Toyota (JP); Tomohiro Sato, Toyota (JP)

(73) Assignees: Yanmar Holdings Co., Ltd., Osaka (JP); Toyota Motor Corporation, Toyota (JP)

( * ) Notice: Subject to any disclaimer, the term of this patent is extended or adjusted under 35 U.S.C. 154(b) by 336 days.

(21) Appl. No.: 17/966,839

(22) Filed: Oct. 15, 2022

(65) Prior Publication Data
US 2023/0132970 A1 May 4, 2023

(30) Foreign Application Priority Data
Oct. 29, 2021 (JP) ................. 2021-177488

(51) Int. Cl.
| | |
|---|---|
| *B60K 1/04* | (2019.01) |
| *A01B 63/10* | (2006.01) |
| *A01B 76/00* | (2006.01) |
| *B60L 1/00* | (2006.01) |
| *B60L 15/20* | (2006.01) |
| *B60L 53/20* | (2019.01) |
| *B60L 58/26* | (2019.01) |
| *B60K 1/00* | (2006.01) |

(52) U.S. Cl.
CPC ............ *B60K 1/04* (2013.01); *A01B 63/1006* (2013.01); *A01B 76/00* (2013.01); *B60L 1/003* (2013.01); *B60L 15/20* (2013.01); *B60L 53/20* (2019.02); *B60L 58/26* (2019.02); *B60K 2001/005* (2013.01); *B60K 2001/0405* (2013.01)

(58) Field of Classification Search
CPC . B60K 1/04; B60L 53/20; B60L 58/26; B60L 1/003; B60L 15/20; A01B 63/1006; A01B 76/00
See application file for complete search history.

(56) References Cited

U.S. PATENT DOCUMENTS

| | | | | |
|---|---|---|---|---|
| 8,002,063 | B2 * | 8/2011 | Rydberg | B60R 16/04 180/68.5 |
| 11,511,642 | B2 * | 11/2022 | Messina | B28C 5/421 |
| 2022/0379704 | A1 * | 12/2022 | Tottori | B60K 1/00 |

FOREIGN PATENT DOCUMENTS

JP   5974637 B2 *  8/2016

OTHER PUBLICATIONS

Mechanical translation of JP5974637 (Year: 2016).*

* cited by examiner

*Primary Examiner* — John D Walters
(74) *Attorney, Agent, or Firm* — Chris Mizumoto

(57) ABSTRACT

The electric tractor is equipped with a battery, a transmission unit, a machine body frame, a rear axle unit, and a front axle unit. The transmission unit shifts the input power and outputs the shifted input power. The machine body frame is fixed to the transmission unit. The rear axle unit supports the rear wheels, and transmits, to the rear wheels, the power output from the transmission unit. The front axle unit supports the front wheels. The rear axle unit and the front axle unit support chassis including the machine body frame and transmission unit. The battery is supported by the chassis.

6 Claims, 4 Drawing Sheets

ELECTRIC TRACTOR

CROSS-REFERENCE

This application claims foreign priority of JP2021-177488 filed Oct. 29, 2021, the disclosure of which is hereby incorporated by reference in its entirety.

TECHNICAL FIELD

The present invention relates to a configuration for supporting various devices in an electric tractor.

BACKGROUND ART

Patent Document 1 discloses a tractor as an electric work vehicle. This tractor is so configured that a battery and a motor are installed in place of an engine. The battery is housed in a sealed state by a battery cover. The outer wall face of the battery cover forms a part of the tractor's exterior.

PRIOR ART DOCUMENT

Patent Document

Patent Document 1: Japanese Unexamined Patent Application Publication No. 2021-000957

SUMMARY OF INVENTION

Technical Problem

The configuration in the Patent Document 1 does not disclose the specific configuration of how the various devices of the electric tractor are supported. Therefore, there remained room for improvement in terms of efficient use of space, etc.

The present invention has been made in view of the above circumstances, and one object thereof is to realize a strong structure to support the battery in the electric tractor.

Means for Solving the Problems and Effect

The problem to be solved by the present invention is as above, and the means for solving the problem and effects by the means are described below.

According to a first aspect of the present invention, there is provided an electric tractor having the following configuration. That is, this electric tractor is equipped with a battery, a transmission unit, a machine body frame, a rear axle unit, and a front axle unit. The transmission unit changes the speed of the input power and outputs the power. The machine body frame is fixed to the transmission unit. The rear axle unit supports rear wheels, and transmits, to the rear wheels, the power output from the transmission unit. The front axle unit supports front wheels. The rear axle unit and the front axle unit support chassis, which is configured to include the machine body frame and the transmission unit. The battery is supported by the chassis.

This allows for a strong support configuration that, in an electric tractor, supports the weight of the battery and the like.

The electric tractor preferably has the following configuration. That is, the electric tractor is equipped with a plate-shaped base member and a vibration-proof member. Without a vibration, the vibration-proof member allows the base member to be supported with respect to the machine body frame. The battery is fixed to the base member.

This allows the support configuration of the battery to be realized in a simplified configuration using the plate-shaped multi-purpose plate.

The electric tractor preferably has the following configuration. That is, the electric tractor is equipped with an on-board charging unit, a cooling unit, an electronic control unit (ECU), an inverter, and a terminal box. The on-board charging unit controls the charging of the battery. The cooling unit cools the battery. The ECU controls the battery. The inverter controls the rotation speed of the motor connected to the battery. The terminal box relays electricity. When the base member is separated from the machine body frame; in addition to the battery, at least one of the on-board charging unit, the cooling unit, the ECU, the inverter, and terminal box are placed on the base member side.

This makes it possible to realize, for electric-related units, a unitization that is based on the base member, and to place the unit in a travel machine body. Therefore, the tractor is easy to handle during manufacturing, etc.

In the above electric tractor described, the battery is preferably placed above an axle of the front wheels.

This allows the minimum ground height of the electric tractor to be easily secured.

In the electric tractor, the on-board charging unit that controls the charging of the battery is preferably placed above the battery.

This allows for a compact placement that includes the battery and the on-board charging unit.

According to a second aspect of the present invention, there is provided an electric tractor having the following configuration. That is, this electric tractor is equipped with a machine body frame, a battery, a travel motor, and a transmission unit. The travel motor is an electric motor that generates power to run a travel machine body. The transmission unit is placed in a more rearward portion of the travel machine body than the battery, in plan view. The machine body frame is equipped with frame members placed in pairs on right and left. In plan view, the travel motor is placed behind the battery and in front of the transmission unit, and is placed between the right and left frame members.

This allows for a strong support configuration that, in an electric tractor, supports the weight of the battery and the like. In addition, since the travel motor is placed behind the battery, it is easy to omit or shorten of a drive shaft between the travel motor and the more rearward transmission unit. In addition, since the travel motor is placed closer to the rear, a space where members can be placed can be obtained between the battery and the travel motor in plan view. Further, since the travel motor is placed between the left and right frame members, a compact configuration can be realized.

According to a third aspect of the present invention, there is provided an electric tractor having the following configuration. That is, this electric tractor is equipped with a machine body frame, a hydraulic pump, and a pump motor. The pump motor is an electric motor that generates power to drive the hydraulic pump. The machine body frame is equipped with frame members placed in pairs on right and left. At least a part of the pump motor is positioned outside the frame member in the left/right direction of a travel machine body.

This allows the pump motor to be compactly placed in a position that does not interfere with a surrounding member.

The electric tractor preferably has the following configuration. That is, this electric tractor is equipped with a pump inverter to control the rotation speed of the pump motor. At least a part of the pump inverter is positioned on the opposite side of the pump motor on right and left, and outside the frame member in the left/right direction.

This allows the pump inverter to be compactly placed in a position that does not interfere with a surrounding member. In addition, the pump motor and the pump inverter are placed separately on the right and left sides of the machine body frame, making it possible to improve the balance of the travel machine body.

According to a fourth aspect of the present invention, there is provided an electric tractor having the following configuration. That is, this electric tractor is equipped with a machine body frame and a pump inverter. The pump inverter controls the rotation speed of the electric motor. The machine body frame is equipped with frame members placed in pairs on right and left. At least a part of the pump inverter is placed outside the frame member in the left/right direction.

This allows the pump inverter to be compactly placed in a position that does not interfere with a surrounding member.

DESCRIPTION OF EMBODIMENTS

Figure 1:
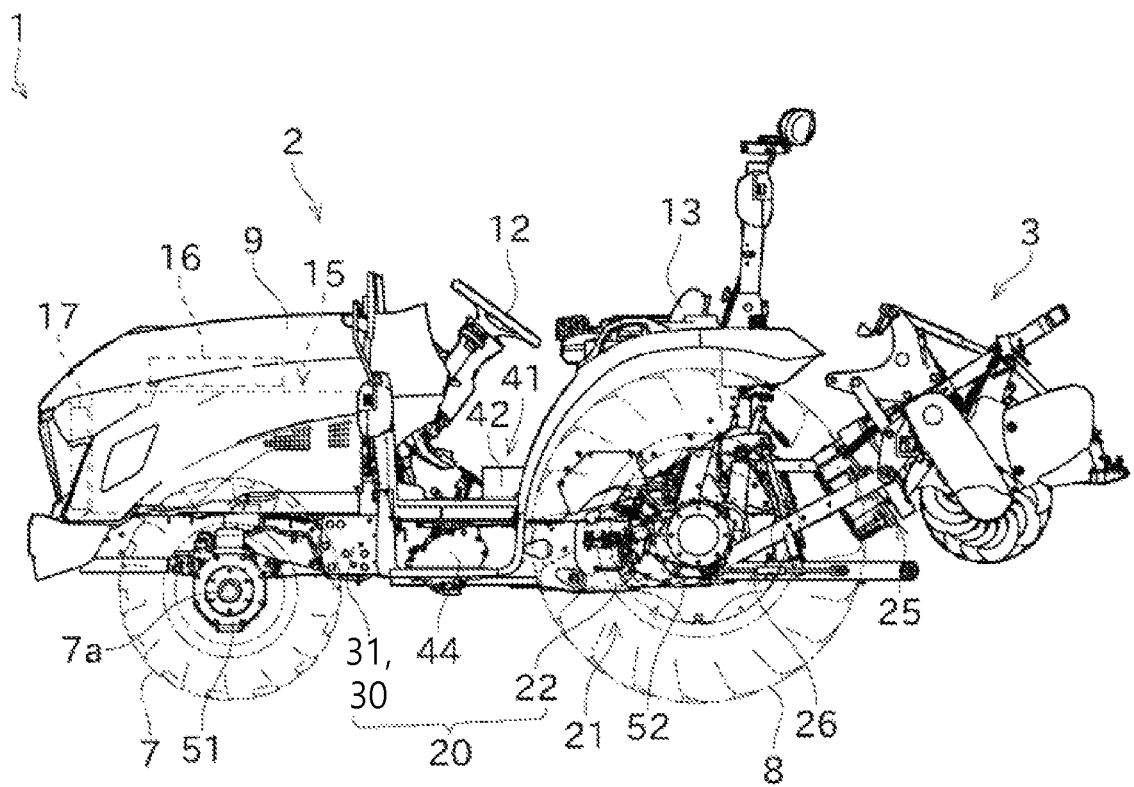
FIG. 1 is a side view of an overall configuration of an electric tractor according to one embodiment of the present invention.

In the following, embodiments of the present invention are described with reference to the drawings. FIG. 1 is a side view of an electric tractor 1 according to one embodiment of the present invention.

The electric tractor 1 shown in FIG. 1 is configured as an agricultural tractor. The electric tractor 1 is equipped with a travel machine body 2 as a body portion that can travel in a farm field.

A work instrument 3 can be connected to the travel machine body 2. The work instruments 3 include, for example, a cultivator (management machine), a plow, a fertilizer, a mower, and a seeding machine. Various types of work instruments 3 can be mounted to the travel machine body 2 as needed.

The front portion of the travel machine body 2 of the electric tractor 1 is supported by a pair of right and left front wheels 7, and the rear portion of the travel machine body 2 is supported by a pair of right and left rear wheels 8.

Chassis 20, which is a strength member of the electric tractor 1, is placed at the bottom portion of the travel machine body 2. The chassis 20 includes a transmission unit 21's housing 22, and a machine body frame 30.

Inside the transmission unit 21, there is placed a transmission mechanism including, for example, a gear train. The transmission unit 21 changes the speed of the power input from a travel motor 41 described below. The power shifted in the transmission unit 21 is transmitted to a front axle unit 51 and a rear axle unit 52.

The transmission unit 21 has the housing 22 that houses the transmission mechanism. The housing 22 is made of cast metal, for example. The housing 22 of the transmission unit 21 has high mechanical rigidity, and therefore is used as a part of the chassis 20.

Figure 2:
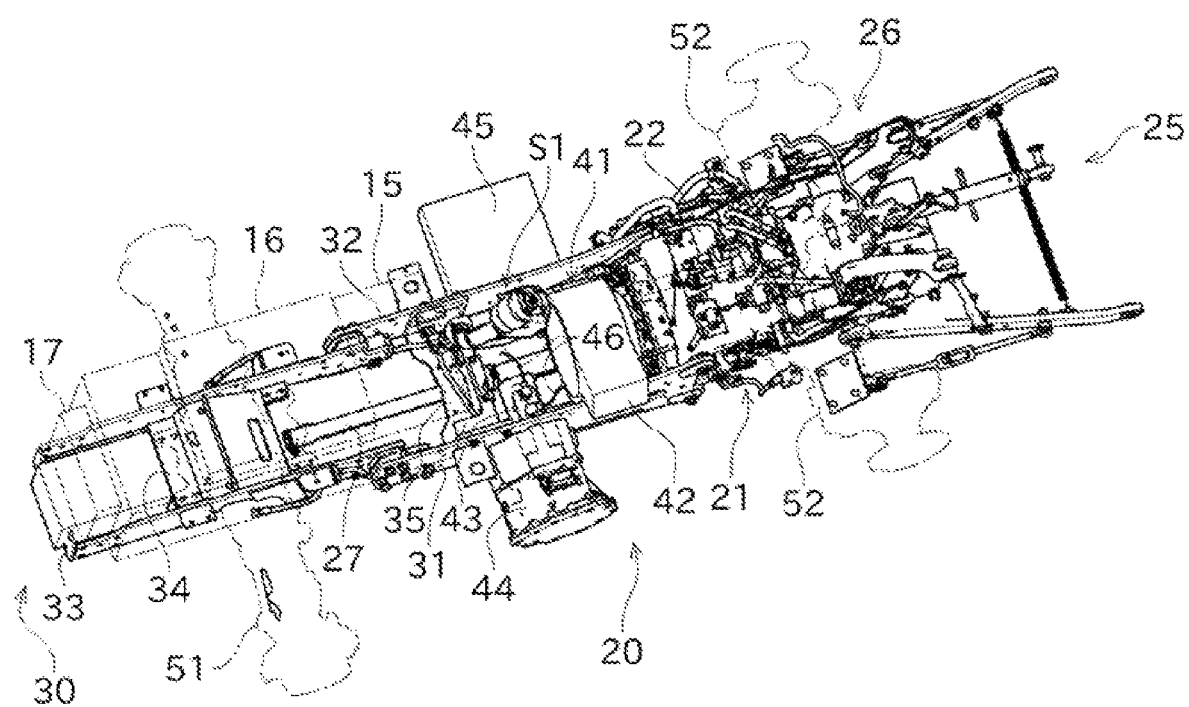
FIG. 2 is a perspective view showing chassis with which the electric tractor is equipped.

As shown in FIG. 2, the machine body frame 30 includes frame members 31, 32 which are placed in pairs on left and right. Each of the two frame members 31, 32 is formed as a plate, and so is placed that its thickness direction is along the left/right direction of the travel machine body 2. A proper interval is formed between the two frame members 31, 32.

The rear end portions of the respective frame members 31, 32 are fixed to the transmission unit 21. The frame members 31, 32 extend forward in a generally horizontal direction from their portions for coupling with the transmission unit 21. Each of the frame members 31, 32 is composed of a plurality of plate-like members connected in the front-back direction.

The two frame members 31, 32 are placed parallel to each other. As shown in FIG. 2, the machine body frame 30 is equipped with a plurality of members including connecting members 33, 34, 35. The connecting members 33, 34, 35 are so placed as to extend in the left/right direction, and connect the two frame members 31, 32 to each other. This increases mechanical rigidity of the machine body frame 30.

A front axle unit 51 is connected to the machine body frame 30 with which the chassis 20 is equipped. The front axle unit 51 supports the weight of the front portion of the chassis 20. The front wheels 7 shown in FIG. 1 are rotatably supported at both ends of the front axle unit 51 in a vehicle width direction. The travel machine body 2 is equipped with a transmission shaft 27 shown in FIG. 2. The transmission shaft 27 connects the front axle unit 51 with the transmission unit 21. To the front axle unit 51, power is input from the transmission unit 21 via the transmission shaft 27. The front axle unit 51 transmits the input power to the front wheels 7. As a result, the front wheels 7 are driven.

The rear axle unit 52 is placed in pairs on right and left in a manner to sandwich the housing 22 of transmission unit 21. Each of the rear axle units 52 is secured to a side of the housing 22 of the transmission unit 21. The rear axle unit 52 supports the weight of the rear portion of the chassis 20. In each of the rear axle units 52, the rear wheel 8 shown in FIG. 1 is rotatably supported at the outer end portions of the vehicle in the vehicle width direction. To the rear wheel 8, the rear axle unit 52 transmits the power input from the transmission unit 21. As a result, the rear wheels 8 are driven.

A hood 9 is placed at the front portion of the travel machine body 2. A battery 15 is housed inside the hood 9. The battery 15 supplies power to a plurality of electric motors that drives the electric tractor 1. The configuration of the battery 15 is optional, and can be, for example, a lithium-ion secondary battery. The battery 15 is so fixed as to be placed on the machine body frame 30. Thus, the battery 15 is positioned higher than an axle 7a of the front wheel 7.

In the interior space of the hood 9, there is provided an on-board charging unit 16 above the battery 15. The on-board charging unit 16 can, for example, convert a household AC power voltage to a DC voltage, making it possible to charge the battery 15.

In the interior space of the hood 9, there is provided a BMS unit 17 in front of the battery 15. BMS is an abbreviation for Battery Management System. The BMS unit 17 is configured as a computer, and is a type of ECU. The BMS unit 17 has a function of monitoring the voltage, temperature, etc. of the battery 15 and thereby detecting an abnormality. The BMS unit 17 also estimates the remaining battery capacity of the battery 15, and outputs the obtained information to the on-board charging unit 16. This prevents overcharging of the battery 15.

Behind the hood 9, there is provided an operator seat 13 on which the operator can be seated. A plurality of human operator-operated members are placed near the operator seat 13. The operated member is, for example, a steering wheel 12 placed in front of the operator seat 13. Although details are omitted, the operated members include, in addition to the steering wheel 12, a main gear shift lever, an auxiliary gear shift lever, a PTO (power take off) gear shift lever, a hydraulic operation switch, and hydraulic operation lever, etc.

Below the operator seat 13, there is placed the above transmission unit 21. To the front end portion of the housing 22 of the transmission unit 21, a housing 42 of the travel motor 41 is fixed. The travel motor 41 is configured as an electric motor, and its output shaft, though not shown, is directed toward the front and rear of the travel machine body 2. The output shaft of the travel motor 41 protrudes rearward from the housing 42, and is connected to an input shaft of the transmission unit 21.

A known 3-point link mechanism 25 is equipped at the rear portion of the travel machine body 2, and the work instrument 3 can be connected to the travel machine body 2 via the 3-point link mechanism 25. A lifting/lowering actuator 26 is placed near the 3-point link mechanism 25. The lifting/lowering actuator 26 includes, for example, a hydraulic cylinder. Driving the lifting/lowering actuator 26 can adjust the height and posture of the work instrument 3 mounted on the travel machine body 2.

As shown in FIG. 2, a hydraulic pump 43 to supply hydraulic oil to various hydraulic units is mounted on the chassis 20. The hydraulic units as objects to which hydraulic oil is supplied may include, but are not limited to, for example, the lifting/lowering actuator 26 and a hydraulic steering unit (not shown). Of the one-side frame member 31 that constitutes the machine body frame 30, the hydraulic pump 43 is fixed to the face that faces inside in the vehicle width direction. Although not shown, a drive input shaft of the hydraulic pump 43 is oriented along the width direction of the travel machine body 2.

A pump motor 44 to drive the hydraulic pump 43 is mounted on the chassis 20. The pump motor 44 is configured as an electric motor. The pump motor 44 is so placed as to be in line with the hydraulic pump 43 in the width direction of the travel machine body 2.

The pump motor 44 is fixed to the frame member 31's face that faces outside in the width direction of the travel machine body 2. In other words, the pump motor 44 is placed on the opposite side of the hydraulic pump 43, sandwiching therebetween the frame member 31. Thus, a housing of the pump motor 44 is positioned outside the machine body frame 30 in the width direction of the travel machine body 2.

Although not shown, the output shaft of the pump motor 44 is oriented along the width direction of the travel machine body 2. The output shaft of the pump motor 44 protrudes through the frame member 31 toward the center side of the travel machine body 2, and is connected to the drive input shaft of the hydraulic pump 43.

A pump inverter 45 to change the rotation speed of the pump motor 44 is mounted on the machine body frame 30. The pump inverter 45 is placed in line with the hydraulic pump 43 and the pump motor 44 substantially in the width direction of the travel machine body 2.

Of the pair of left and right frame members 31, 32 included in the machine body frame 30, the pump inverter 45 is fixed to frame members 32 on the opposite side of the frame member 31 to which the pump motor 44 is mounted. The pump inverter 45 is fixed to the frame member 32's face that faces outside in the width direction of the travel machine body 2. Therefore, the pump inverter 45 is placed outward on the opposite side of the pump motor 44 in the width direction of the travel machine body 2, more than the machine body frame 30.

The above layout allows the hydraulic pump 43, the pump motor 44, and the pump inverter 45 to be preferably supported by the chassis 20. To the machine body frame 30, the pump motor 44 is placed on one side in the width direction of the travel machine body 2, and the pump inverter 45 is placed on the opposite side, thus making it easy to secure the balance of the travel machine body 2.

A PTO shaft, not shown, is placed at the travel machine body 2. The PTO shaft is connected to the drive input shaft of the work instrument 3. To drive the PTO shaft, a PTO drive motor (not shown) is installed at a proper position of the travel machine body 2. The PTO drive motor is configured as an electric motor. The PTO drive motor can drive the work instrument 3 via the PTO shaft.

The electric tractor 1 according to the present embodiment is equipped with the travel motor 41 as a drive source for running the travel machine body 2. Meanwhile, as a variation of the tractor specification, the tractor could be configured with the chassis 20 kept common, and with an engine placed instead of the electric motor.

Suppose that in the engine specification, a housing for the engine and clutch is used as part of the chassis. In this configuration; at the time of attempting to change to the electric motor specification, the chassis is not strong enough because of the loss of the housing as the strength member. Therefore, it is difficult to share the chassis between the two specifications.

In this respect; in the chassis 20 of the present embodiment, the machine body frame 30, which includes a pair of plate-shaped members, extends from the transmission unit 21 to the vicinity of the front end of the travel machine body 2. In other words, a middle portion of the machine body frame 30 is not interrupted. It is suggested that, when this chassis 20 is applied to the engine specification, the engine is mounted in the space where the battery 15 was mounted in the hood 9. Thus, when the chassis 20 of the configuration of the present embodiment is shared between the electric motor specification and the engine specification, the mechanical strength can be easily secured regardless of which specification is used.

In the present embodiment, the travel motor 41 is so placed to the transmission unit 21 as to be in close proximity at the front side. In the present embodiment, the housing 42 of the travel motor 41 is directly secured to the front portion of the housing 22 of the transmission unit 21. At least a part of the housing 42 is so placed as to be inserted between the left and right frame members 31, 32.

This layout makes it possible to directly connect the output shaft of the travel motor 41 with the input shaft of the transmission unit 21. Thus, the drive shaft connecting both is omitted. However, the output shaft of the travel motor 41 may be connected with the input shaft of the transmission unit 21 via a short drive shaft that is not exposed to the outside.

This direct layout allows the travel motor 41 to be placed closer to the rear, and, as shown in FIG. 2, a proper space Si can be secured between the battery 15 and the travel motor 41 and between the left and right frame members 31, 32, in plan view. In the present embodiment, the hydraulic pump 43 and a hydraulic piping 46 that leads the hydraulic oil are placed in this space Si. Thus, effectively utilizing the space Si can compactly place the hydraulic pump 43, etc.

As described above, the electric tractor 1 of the present embodiment is equipped with the battery 15, the transmission unit 21, the machine body frame 30, the rear axle unit 52, and the front axle unit 51. The transmission unit 21 shifts the input power and outputs the shifted input power. The machine body frame 30 is fixed to the transmission unit 21. The rear axle unit 52 supports the rear wheels 8, and transmits, to the rear wheels 8, the power output from the transmission unit 21. The front axle unit 51 supports the front wheels 7. The rear axle unit 52 and the front axle unit 51 support the chassis 20. The chassis 20 includes the machine body frame 30 and the transmission unit 21. The battery 15 is supported by the chassis 20.

This enables the electric tractor 1 to have a strong support configuration that supports the weight of the battery 15 and the like.

In the electric tractor 1 of the present embodiment, the battery 15 is placed above the axle of the front wheels 7.

This allows the minimum ground height of the electric tractor 1 to be easily secured.

In the electric tractor 1 of the present embodiment, the on-board charging unit 16 that controls the charging of the battery 15 is placed above the battery 15.

This allows for a compact placement that includes the battery 15 and the on-board charging unit 16.

The electric tractor 1 of the present embodiment is also equipped with the machine body frame 30, the battery 15, the travel motor 41, and the transmission unit 21. The travel motor 41 is an electric motor that generates power to run the travel machine body 2. The transmission unit 21 is placed in a more rearward portion of the travel machine body 2 than the battery 15, in plan view. The machine body frame 30 has the frame members 31, 32 placed in pairs on left and right. The travel motor 41 is placed behind the battery 15 and in front of the transmission unit 21 in plan view, and is placed between the left and right frame members 31, 32.

This enables the electric tractor 1 to have a strong support configuration that supports the weight of the battery 15 and the like. In addition, since the travel motor 41 is placed behind the battery 15, it is easy to omit or shorten the drive shaft between the travel motor 41 and the more rearward transmission unit 21. Since the travel motor 41 is placed closer to the rear, the space where members can be placed can be obtained between the battery 15 and the travel motor 41 in plan view. Since the travel motor 41 is placed between the left and right frame members 31, 32, a compact configuration can be realized.

The electric tractor 1 of the present embodiment is equipped with the machine body frame 30, the hydraulic pump 43, and the pump motor 44. The pump motor 44 is an electric motor that generates power to drive the hydraulic pump 43. The machine body frame 30 is equipped with the frame members 31, 32 placed in pairs on left and right. At least a part of the pump motor 44 is positioned outside the frame members 31, 32 in the left/right direction of the travel machine body 2.

This allows the pump motor 44 to be compactly placed in the position that does not interfere with a surrounding member.

The electric tractor 1 of the present embodiment is equipped with the pump inverter 45 to control the rotation speed of the pump motor 44. At least a part of the pump inverter 45 is positioned on the opposite side of the pump motor 44 on right and left, and the outside the frame members 31, 32 in the right/left direction.

This allows the pump inverter 45 to be compactly placed in the position that does not interfere with a surrounding member.

The electric tractor 1 of the present embodiment is equipped with the machine body frame 30 and the pump inverter 45. The pump inverter 45 controls the rotation speed of the pump motor 44 which is an electric motor. The machine body frame 30 is equipped with the frame members 31, 32 placed in pairs on left and right. At least a part of the pump inverter 45 is placed outside the frame members 31, 32 in the left/right direction.

This allows the pump inverter 45 to be compactly placed in a position that does not interfere with a surrounding member and to be firmly supported by the machine body frame 30.

Figure 3:
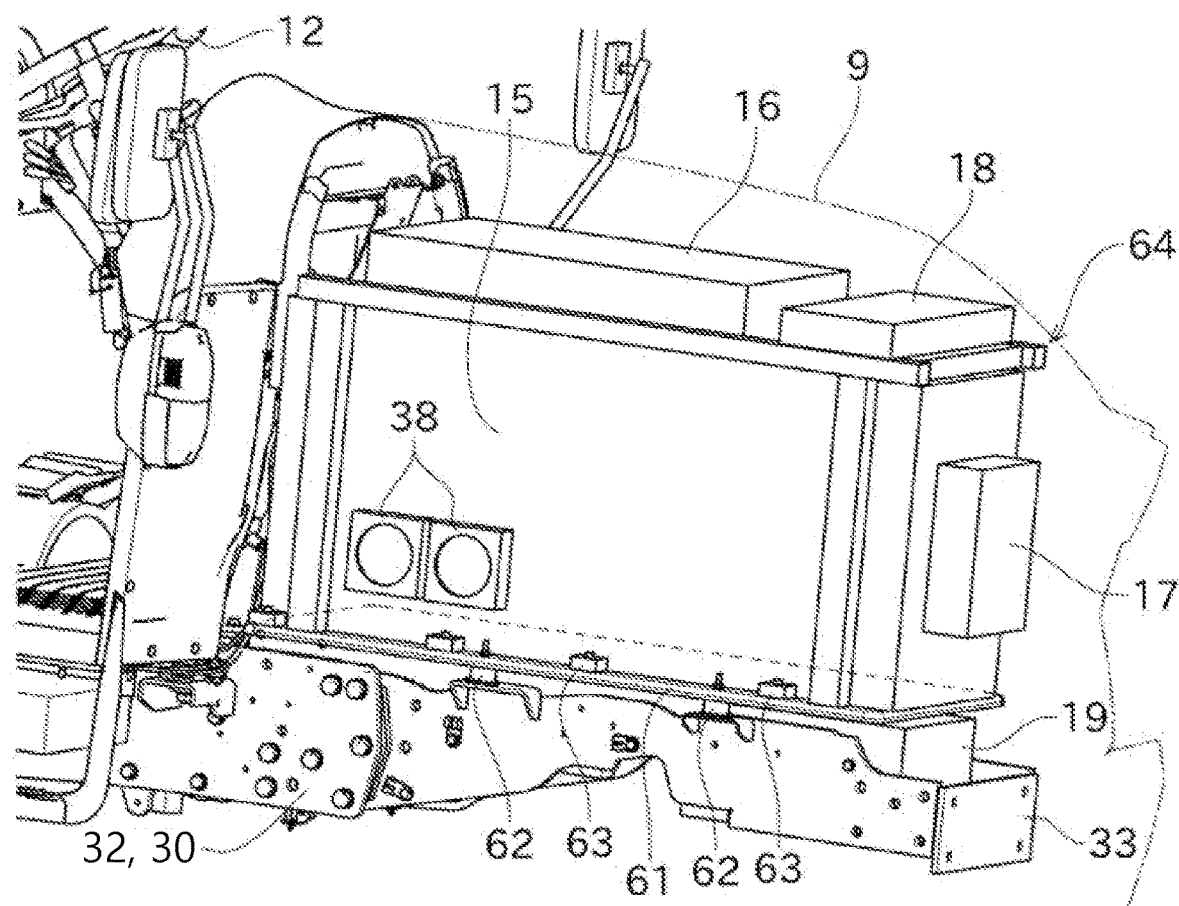
FIG. 3 is a perspective view showing inside of a hood of an electric tractor of another configuration.
Figure 4:
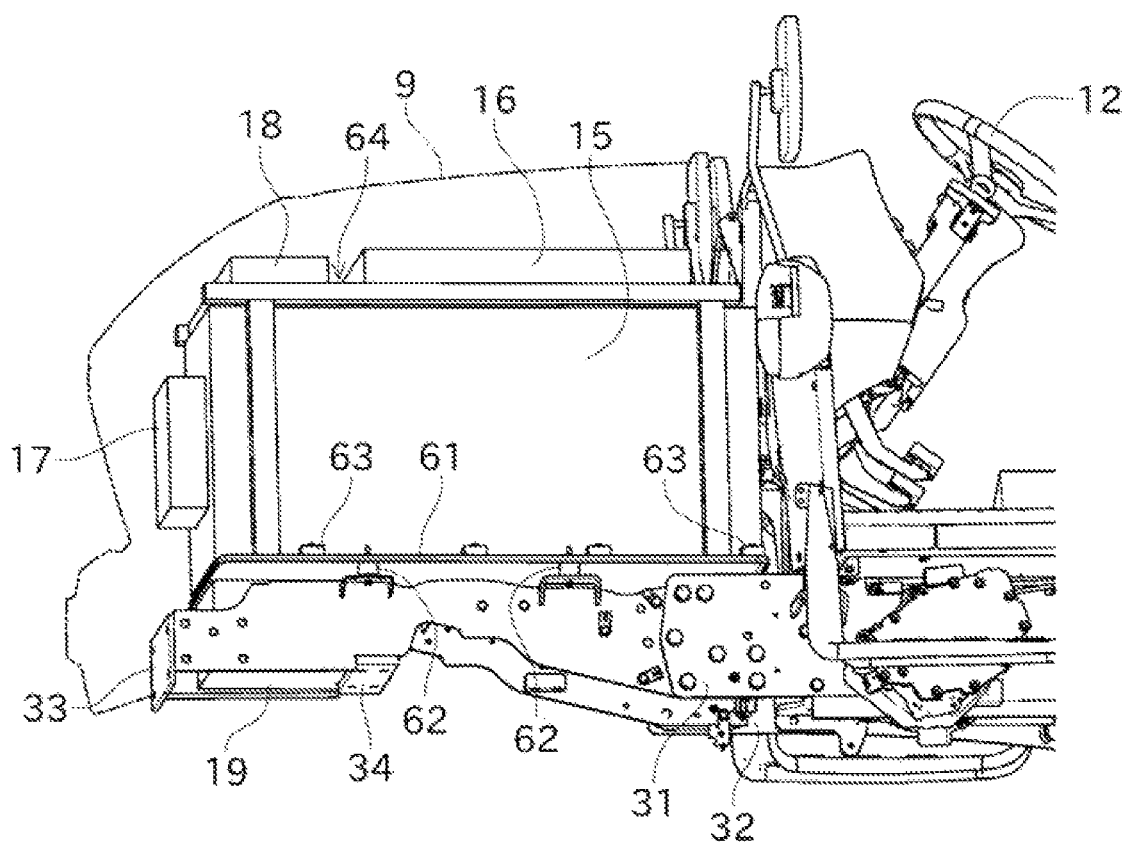
FIG. 4 a perspective view showing the inside of the hood from a viewpoint different from that of FIG. 3.

Referring now to FIGS. 3 and 4, another configuration for supporting the battery 15 and the like at the front portion of the travel machine body 2 is to be described. In the following description, parts identical with or similar to those of the above embodiment are marked with the same symbols in the drawings, and a description thereof will be omitted as the case may be.

In the electric tractor 1 shown in FIGS. 3 and 4, a multi-purpose plate (base member) 61 is placed above the front portion of the machine body frame 30. The multi-purpose plate 61 is a horizontal plate-like member. The multi-purpose plate 61 is so placed as to straddle the pair of frame members 31, 32 with which the machine body frame 30 is equipped.

The two frame members 31, 32 each have two brackets extending outward on the left and right. A vibration-proof member 62 is mounted to each bracket. Each of the vibration-proof members 62 includes a member capable of cushioning an impact, e.g., rubber. The four vibration-proof members 62 support the lower face of the multi-purpose plate 61. This allows the multi-purpose plate 61 to be supported with respect to the machine body frame 30 free from a vibration.

The above battery 15 is placed on the upper face of the multi-purpose plate 61. The battery 15 is fixed to the multi-purpose plate 61 by a plurality of fixing blocks 63 and the like. To increase rigidity, convex portions that protrude upward or downward may be formed on the multi-purpose plate 61.

On the upper side of the multi-purpose plate 61, there is provided a support frame 64. The support frame 64 is composed of a combination of a plurality of linearly elongated members. The support frame 64 is so placed as to surround the battery 15. The support frame 64 is fixed to the upper face of the multi-purpose plate 61.

The on-board charging unit 16 is fixed to the upper face of the battery 15. The BMS unit 17 is fixed to the front face of the battery 15.

A terminal box 18 is placed in front of the on-board charging unit 16. The terminal box 18 is fixed to the upper portion of the support frame 64. A plurality of wires, not shown in the figure, are connected to the terminal box 18. The terminal box 18 relays electricity, for example, across the battery 15 and an inverter 19.

The inverter 19 is fixed to the lower face of the multi-purpose plate 61. The inverter 19 controls the rotation speed of the travel motor 41. The inverter 19 is so supported by the multi-purpose plate 61 as to be suspended down. At the front end portion of the machine body frame 30, the inverter 19 is placed between the pair of left and right frame members 31, 32.

A cooling fan (cooling unit) 38 is placed on one of the right and left sides of the battery 15. The battery 15 has a water cooling system, not shown in the figure, for cooling. The cooling fan 38 blows air toward a radiator with which the water cooling system is equipped.

Thus, in the example shown in FIGS. 3 and 4, an electric unit including the battery 15, the on-board charging unit 16, the BMS unit 17, the terminal box 18, the inverter 19, and the cooling fan 38 are placed on the multi-purpose plate 61 placed above the machine body frame 30.

Therefore, when the multi-purpose plate 61 is removed from the machine body frame 30, the battery 15, the on-board charging unit 16, the BMS unit 17, the terminal box 18, the inverter 19, and the cooling fan 38 are positioned on the multi-purpose plate 61 side. Since the electric unit can be built in this way with the multi-purpose plate 61 as the base member, it is easy to share the chassis 20 with the above engine specification. It also facilitates the manufacture of tractors with the electric motor specifications.

As described above, the electric tractor 1 is equipped with the plate-shaped multi-purpose plate 61 and the vibration-proof member 62. Without a vibration, the vibration-proof member 62 allows the multi-purpose plate 61 to be supported with respect to the machine body frame 30. The battery 15 is fixed to multi-purpose plate 61.

This allows the support configuration of the battery 15 to be realized in a simplified configuration using the plate-shaped multi-purpose plate 61.

The electric tractor 1 of the present embodiment also includes the on-board charging unit 16, the cooling fan 38, the BMS unit 17, the inverter 19, and the terminal box 18. The on-board charging unit 16 controls the charging of the battery 15. The cooling fan 38 cools the battery 15. The BMS unit 17 controls the battery 15. The inverter 19 controls the rotation speed of the travel motor 41 connected to the battery 15. The terminal box 18 relays electricity. When the multi-purpose plate 61 is separated from the machine body frame 30; in addition to the battery 15, the on-board charging unit 16, the cooling fan 38, the BMS unit 17, the inverter 19, and the terminal box 18 are placed on the multi-purpose plate 61 side.

This makes it possible to realize, for electric-related units, a unitization that is based on the multi-purpose plate 61, and to place the unit in the travel machine body 2. Therefore, the electric tractor 1 is easy to handle during manufacturing, etc.

Although the preferred embodiment of the present invention has been described above, the above configurations can be modified as follows.

In the configurations shown in FIGS. 1 and 2, the lower face of the battery 15 is substantially the same in height as the upper face of the machine body frame 30. Meanwhile, the lower portion of the battery 15 may be so placed as to be inserted between the two frame members 31, 32. The lower end of the battery 15 may be placed in a position lower than the axle 7a of the front wheels 7.

Not limited to the on-board charging unit 16, various components (e.g., an electric part such as harness connector) can be placed above the battery 15.

The placement of the battery 15, on-board charging unit 16, and BMS unit 17 in the inner portion of the hood 9 is optional. For example, both the on-board charging unit 16 and the BMS unit 17 can be placed above the battery 15.

The BMS unit 17 may be placed above the battery 15, and the on-board charging unit 16 may be placed in front of the battery 15.

In the configurations shown in FIGS. 3 and 4 as well, placing of the on-board charging unit 16, the BMS unit 17, the terminal box 18, the inverter 19, and the cooling fan 38 can be changed as needed. For example, at least one of the on-board charging unit 16, the BMS unit 17, the terminal box 18, and the cooling fan 38 can be placed below the multi-purpose plate 61. The inverter 19 can be placed above the multi-purpose plate 61.

The pump motor 44 may be placed entirely outside the machine body frame 30 on right and left, or only partially outside the machine body frame 30 on right and left. The same applies to the pump inverter 45.

The position of the pump inverter 45 is optional; for example, the pump inverter 45 can be placed at the front end portion of the machine body frame 30.

The cooling fan 38 shown in FIG. 3 can be so modified as to simply blow air onto and cool the battery 15, instead of blowing air onto the radiator in the water cooling method.

In the configurations shown in FIGS. 3 and 4, at least one of the on-board charging unit 16, the BMS unit 17, the terminal box 18, the inverter 19, etc., can be mounted on the machine body frame 30 side instead of the multi-purpose plate 61 side.

The placement of the pump motor 44 and pump inverter 45 shown in FIGS. 1 and 2, can be applied to the configuration having the multi-purpose plate 61 as shown in FIGS. 3 and 4.

REFERENCE SIGNS LIST

1: electric tractor
7: front wheel
7a: axle of front wheel
8: rear wheel
15: battery
16: on-board charging unit
17: BMS unit (ECU)
18: terminal box
19: inverter
20: chassis
21: transmission unit
30: machine body frame
31: frame member
32: frame member
38: cooling fan (cooling unit)
41: travel motor
43: hydraulic pump
44: pump motor (electric motor)
45: pump inverter
51: front axle unit
52: rear axle unit
61: multi-purpose plate (base member)
62: vibration-proof member

The invention claimed is:
1. An electric tractor comprising:
   a battery;
   an on-board charging unit that controls charging of the battery;
   a cooling unit that cools the battery;
   an electronic control unit (ECU) that controls the battery;
   an inverter that controls rotation speed of a motor connected to the battery;
   a terminal box that relays electricity, a transmission unit that shifts input power and outputs the shifted input power;

a machine body frame fixed to the transmission unit;

a rear axle unit that supports a rear wheel, and transmits, to the rear wheel, the power output from the transmission unit; and a front axle unit that supports a front wheel, a plate-shaped base member;

a vibration-proof member that allows the base member to be supported with respect to the machine body frame, wherein the rear axle unit and the front axle unit support a chassis including the machine body frame and the transmission unit, and the battery is supported by the chassis and fixed to the base member, and wherein when the base member is separated from the machine body frame and, in addition to the battery, at least one of the on-board charging unit, the cooling unit, the ECU, the inverter, and the terminal box is placed on the base member side.

2. The electric tractor as claimed of claim 1, wherein the battery is placed above an axle of the front wheel.

3. The electric tractor of claim 1, further comprising:

a travel motor which is an electric motor that generates power to run a travel machine body;

wherein the transmission unit is placed in a more rearward portion of the travel machine body than the battery, in plan view, wherein the machine body frame includes frame members placed in pairs on right and left, and the travel motor is placed behind the battery and in front of the transmission unit in plan view, and is placed between the right and left frame members.

4. An electric tractor comprising:

a battery;

a transmission unit that shifts input power and outputs the shifted input power;

a machine body frame fixed to the transmission unit;

a rear axle unit that supports a rear wheel, and transmits, to the rear wheel, the power output from the transmission unit; and a front axle unit that supports a front wheel, wherein an on-board charging unit that controls charging of the battery is placed above the battery, and wherein the rear axle unit and the front axle unit support a chassis including the machine body frame and the transmission unit, and the battery is supported by the chassis.

5. An electric tractor comprising:

a machine body frame;

a hydraulic pump; and a pump motor, which is an electric motor that generates power to drive the hydraulic pump, and a pump inverter to control rotation speed of the pump motor, wherein the machine body frame includes frame members placed in pairs on right and left, and at least a part of the pump motor is positioned outside the frame members in a left-right direction of a travel machine body, and wherein at least a part of the pump inverter is positioned on the opposite side of the pump motor on right and left, and outside the frame member in the left-right direction.

6. The electric tractor of claim 5, further comprising:

a pump inverter for controlling rotation speed of an electric motor, wherein the machine body frame includes frame members placed in pairs on right and left, and at least a part of the pump inverter is positioned outside the frame members in a right-left direction.

\* \* \* \* \*